UNITED STATES PATENT OFFICE 2,398,492

PROCESS FOR REFINING FATS

George Burt Bradshaw, Wilmington, Del., and Walter Christian Meuly, New Brunswick, N. J., assignors to E. I. du Pont de Nemours & Company, Wilmington, Del., a corporation of Delaware No Drawing. Application November 13, 1944, Serial No. 563,306

5 Claims. (Cl. 260—421)

This invention relates to a process of refining fats. More particularly it relates to the conversion of free fatty acids contained in many commercial fats and oils into neutral alkylesters by an alkylation process which avoids the presence of free mineral acid in the reaction mass during the process. This method of converting fatty acids into their alkylesters is especially valuable for adapting low-grade fats, containing considerable amounts of free fatty acids, to the process for making pure soaps described and claimed in our earlier U. S. Patent No. 2,271,619. The process of said patent comprises in its essence the steps of replacing first the glycerine radical in a higher, fatty-acid glyceride by the radical of a saturated, aliphatic, monohydric alcohol having less than 5 carbon atoms and then proceeding with the saponification.

Refining fats for the purpose of removing free fatty acids is an important commercial operation. The most common method used heretofore for achieving this result is a treatment of fats containing free fatty acids with an equivalent amount of aqueous caustic soda. Thereby the free fatty acids are converted into soda soaps which precipitate out as a curd and can be separated from the fat. Among the drawbacks of this method is the fact that the curd entrains with itself a portion of the neutral fat, which is about equivalent in quantity to the content of free fatty acids of the fat. In the case of commercial greases which contain as much as 20% by weight of free acids, the removal of the latter will involve a loss of about 40% from the original fat. The 40% which are removed by this treatment are recovered as a mixture of soaps and fat and the value of these "foots" is greatly inferior to the value of the original fat. This procedure is therefore prohibitive with fats containing such a high proportion of free fatty acids.

Another method which has been proposed heretofore consists in treating an acid fat with glycerine or esters of glycerine, such as glycerine chlorohydrine, in order to reesterify the free fatty acids to neutral glycerides. In order to achieve this result, temperatures of 250–300° C. are required, and the reaction is difficult to bring to completion without also forming di- and monoglycerides.

It has also been proposed to refine fats containing free fatty acids by treating them with alcohols and sulfuric acid in order to achieve esterificaion of the free fatty acids. This procedure suffers from many drawbacks. In the first place, a very large excess of alcohol is needed to obtain esterification; and secondly; acid resisting apparatus is needed to withstand the prolonged exposure to the boiling alcohols containing sulfuric acid. In order to improve the yield of esters, it has been proposed to distill off constantly a portion of the alcohol and free this portion from its water content by fractional distillation, so that the alcohol can be returned to the reaction mass to further the esterification. In this system, large volumes of alcohol have to be distilled from the reaction mass. Finally, the treatment of fats with sulfuric acid causes darkening and decomposition of part of the fats.

It is accordingly an object of this invention to provide a process for the treatment of low-grade fats, that is fats containing a considerable proportion of free fatty acids, whereby to esterify such free fatty acids without running into the difficulties aforenoted. Another object is to achieve esterification of the free acid content of a fat with maximum economy of materials and energy, and with minimum waste of the glycerine potentially contained in the fat. A further object is to achieve a refining step which will put the fats into a form especially suitable for conversion into alkylesters according to the aforesaid U. S. P. 2,271,619. In other words, it is one of our objects to provide a process for refining low-grade fats which will cooperate with the subsequent treatment of the fat according to U. S. Patent No. 2,271,619 to yield in the end a product wherein all the fatty-acid constituents, whether originally present as glycerides or as free acids, exist in the form of the same lower-alkyl ester, thereby presenting a substantially uniform raw material for further conversion into soap. Other and further important objects of this invention will appear as the description proceeds.

Now, according to our invention, the above objects are achieved by esterifying the free-acid component of the fat by the aid of a lower dialkyl sulfate under conditions which avoid development of free sulfuric acid in any substantial concentration during said esterification. More particularly, we propose to treat low-grade fats with a quantity of dimethyl or diethyl sulfate corresponding stoichiometrically to the quantity of free acid present in the mass or in slight excess thereover, and effecting the esterification at moderate temperatures in the presence of an acid-absorbing agent which is sufficiently alkaline to neutralize any sulfuric acid liberated in the process but not sufficiently strong to saponify the free fatty acids. By way of illustration, we may employ as acid-binding agents soda ash, sodium bicarbonate, potassium carbonate or any other compound which will react with sulfuric acid to produce a soluble sulfate, but we prefer to avoid strong alkalis like sodium hydroxide or potassium hydroxide.

It is a further preferred feature of our invention to avoid large excesses of either of the aforementioned reagents, limiting the quantity of both the dialkyl sulfate and acid-binder to not more than 50% in excess of that theoretically required according to the acid number of the fat.

Without limiting our invention to any particular procedure, the following examples are given to illustrate our preferred mode of operation. Parts mentioned are by weight.

Example 1

1000 parts of tallow having an acid value of 23 (number of milligrams of potassium hydroxide required to neutralize the free fatty acids in 1 gram of the substance) are heated in an iron vessel to about 80° C. so as to be in the liquid state. 32 parts of dimethyl sulfate and 43 parts of sodium bicarbonate are then fed in simultaneously, under constant mechanical agitation. The temperature of the mixture is raised to 110°–115° C. over 1 hour and held at this temperature for 3 hours longer. There occurs evolution of carbon dioxide and water vapors, and provision must be made to provide an outlet pipe for these gases. The reaction mass is not acidic at any time. After cooling to ordinary temperature the mass is directly suitable for conversion to fatty-acid methyl-esters according to the methods of our earlier U. S. Patent No. 2,271,619. Thereby this tallow is converted, in its entirety, into methyl esters without any difficulties of soap formation due to the original content of free fatty acids. Analysis of the fat after treatment with dimethyl sulfate indicates that the acid value has dropped from 23 to 1.0. From the acid values before and after treatment it may be calculated that the original tallow contained 11.6% of free fatty acids (assuming average constitution as

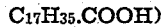

$C_{17}H_{35}.COOH$)

while after esterification the content of free fatty acids had dropped to .5%. This is an acid value of as low an order as found in the best grades of edible tallow. The quantities of dimethyl sulfate and sodium bicarbonate hereinabove employed are about 25% above the theoretical amounts.

Example 2

1000 parts of grease with an acid value of 44 are heated to 140–150° C. in an iron vessel provided with an outlet pipe for liberated carbon dioxide and water vapors, and the free fatty acids are methylated by the addition of 62 parts dimethyl sulfate and 6 parts soda ash. There is considerable evolution of carbon dioxide during the reaction which may cause foaming. This can largely be overcome by adding the dimethyl sulfate and the alkali alternately in portions, for instance in 4 portions each, over a period of 2 hours. After all has been added, the reaction mass is held at 140–150° C. for 2–3 hours. Analysis of the grease indicates a drop in acid value to 1.0 and the reaction mass is suitable at once for conversion to methyl esters according to the methods of U. S. Patent 2,271,619. By this treatment the content of free fatty acids in the grease has been reduced from 22% to .5%.

It will be understood that the above examples are merely illustrative, and that considerable departure from the details thereof may be practiced, within the skill of those engaged in this art. Thus, the temperature may be varied considerably, although from a technical standpoint it is desirable to operate this process at the lowest possible temperature. Good results may be obtained at a temperature of 80° C., if the amount of dimethyl sulfate is increased to 200% of theory. The practical operative range is from 70° C. to 150° C., although higher temperatures may be employed.

The speed of the alkylation increases with the temperature, but it has been found that after 6 hours no further esterification takes place. The practical operative range is about 1 to 6 hours.

If it is desired to remove the free fatty acids from a fat completely, a small excess of alkylating agent and acid-binding agent is required, to the extent of 10–25% above theory. If it is desired to reduce the free fatty acid content only in part, smaller amounts may be used. In order to get maximum yields from a given amount of dialkyl sulfate and in order to prevent the reaction mass from accumulating mineral acid, it is necessary to use an amount of acid-binding agent equivalent to the dialkyl sulfate employed. A slight excess above equivalency is desirable.

In place of dimethyl sulfate, other lower dialkyl sulfates may be used, e. g., diethyl sulfate. Sodium carbonate and bicarbonate can be replaced by other metal salts of weak acids, as long as they are capable of binding sulfuric acid and forming a soluble salt therewith; e. g., potassium carbonate, magnesium carbonate, sodium borate, sodium sulfite. Instead of tallow or grease, other commercial fats and oils of vegetable or animal origin may be treated according to this invention, for instance olive oil, coconut oil; also by-product oils from other operations, such as foots from oil refining operations, where the main ingredients are mixtures of glycerides and free fatty acids.

One of the outsanding advantages of our process, in addition to those already indicated above, is that it may be applied to fats having a considerable moisture content, as is generally the case with low grade fats. Moreover, due to the combined action of the applied heat and evolution of $CO_2$, such moisture is largely eliminated in the course of our esterification process. Thus, in Example 1 above, the fat had initially a moisture content of 2.0%, but the resulting product was free of any detectable quantities of moisture. This is a very important incidental feature of our refinement process, inasmuch as the ester interchange according to U. S. Patent No. 2,271,619 requires that the fat be substantially anhydrous.

In the claims below the expressions "lower alkyl," "lower dialkyl" shall be construed as referring to alkyl radicals not higher than ethyl.

We claim as our invention:

1. A process for refining a low-grade fat, which comprises esterifying the free acid components thereof by treatment with a dialkyl sulfate not higher than diethyl sulfate, in the presence of an acid absorbing agent in quantity sufficient to neutralize the mineral acid liberated by the esterification process.

2. A process as in claim 1, the quanity of dialkyl sulfate employed being not substantially more than 50% in excess of the quantity stoichiometrically corresponding to the free acid content of the fat.

3. A process for refining a low-grade fat, which comprises esterifying the free acid components thereof by treatment with a quantity of dimethyl sulfate equal to about 125% of the stoichiometric quantity corresponding to the free acid content of the fat, and with a quantity of an alkali-metal carbonate substantially equivalent to the quantity of dimethyl sulfate employed.

4. A process of converting a low-grade fat into a product useful for soap making with maximum saving of the glycerine by-product, which comprises reacting said fat with a quantity of a lower dialkyl sulfate sufficient to alkylate the free-acid components of the fat, in the presence of an acid-absorbing agent in quantity sufficient to neutralize the mineral acid liberated by the alkylation process, and then further reacting the fat with a saturated, aliphatic, monohydric alcohol having less than 5 carbon atoms to convert the glyceride components of the fat into corresponding alkyl esters, and recovering the glycerine liberated by this process.

5. A process for converting a low-grade fat consisting essentially of a mixture of glycerides of fatty acids with free fatty acids into a substantially uniform mixture of a lower alkyl ester of said fatty acids, which comprises first treatment of said fat with a lower dialkyl sulfate in quantity not in substantial excess of that corresponding stoichiometrically to the free acid content of said fat, in the presence of an acid-absorbing agent of a nature and quantity which will not saponify said free fatty acids but will neutralize the free sulfonic acid liberated in said treatment, and then further reacting said fat with a lower alcohol corresponding to the aforementioned dialkyl-sulfate in the presence of alkali, under conditions adapted to convert the glyceride component of the fat into the corresponding lower alkyl esters.

GEORGE BURT BRADSHAW.
WALTER CHRISTIAN MEULY.